Figure 1:
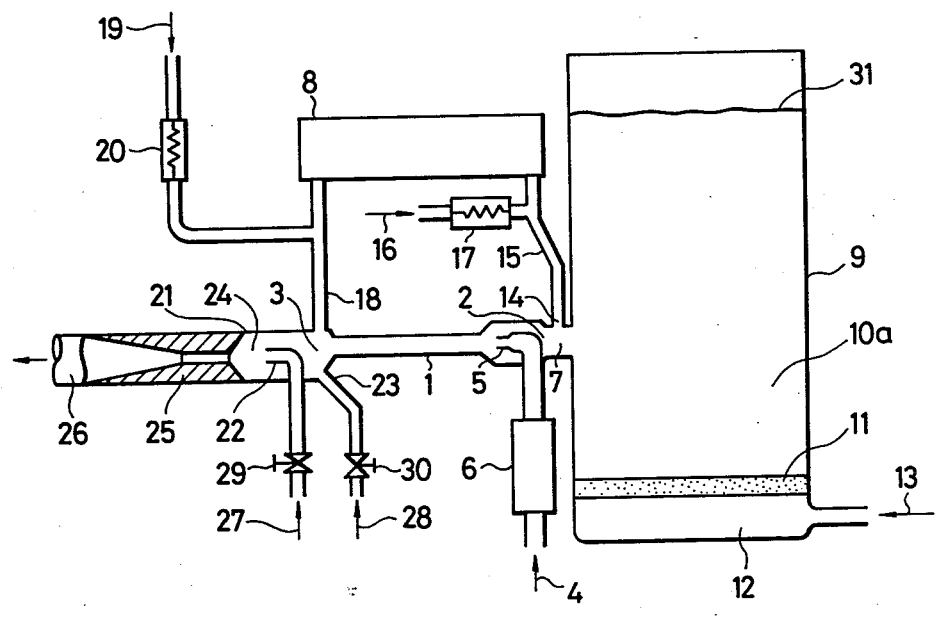

United States Patent [19]

Nagasaka

[11] Patent Number: 4,480,947

[45] Date of Patent: Nov. 6, 1984

[54] POWDER FLOW RATE MEASURING APPARATUS

[76] Inventor: Hideo Nagasaka, 389-7, Minamitakano-machi, Hitachi-shi, Ibaraki-ken, Japan

[21] Appl. No.: 388,084

[22] Filed: Jun. 14, 1982

[30] Foreign Application Priority Data

Jun. 17, 1981 [JP] Japan .................................. 56-93542

[51] Int. Cl.³ .......................... B65G 53/66; G01F 1/37; G01F 1/74
[52] U.S. Cl. ....................................... 406/14; 406/30; 73/861.04; 73/861.52
[58] Field of Search ............................. 406/14, 30, 34; 73/861.04, 861.52

[56] References Cited

U.S. PATENT DOCUMENTS

| | | | |
|---|---|---|---|
| 2,272,564 | 2/1942 | Kuever | 406/34 |
| 2,439,723 | 4/1948 | Engdahl | 73/861.04 X |
| 2,916,441 | 12/1959 | Kruse, Jr. | 406/30 X |
| 2,984,105 | 5/1961 | Nagel et al. | 73/861.04 X |
| 3,127,770 | 4/1964 | Allard et al. | 73/861.04 |
| 4,231,262 | 11/1980 | Boll | 73/861.04 |

*Primary Examiner*—Herbert Goldstein
*Attorney, Agent, or Firm*—Price, Heneveld, Huizenga & Cooper

[57] ABSTRACT

A novel powder flow rate measuring apparatus having a simple structure is described herein, in which a conveying fluid is injected through a nozzle into an inlet of a single detecting pipe line having an inlet and an outlet, also a powder material within a powder tank is introduced into the same inlet, and a pressure difference between the inlet and outlet of the detecting pipe line at this moment is detected, whereby a flow rate of the powder material flowing through the detecting pipe line can be measured. The thereby obtained measured value is essentially very close to a mass flow rate of the powder material, and moreover the measured value can be obtained continuously.

16 Claims, 16 Drawing Figures

POWDER FLOW RATE MEASURING APPARATUS

The present invention relates to improvements in a powder flow rate measuring apparatus, and more particularly, to a measuring apparatus that is simple in structure and less expensive, in which the flow rate of powder material can be precisely and continuously measured by detecting a pressure difference produced across a detecting pipe line by both a powder material introduced into an inlet of the detecting pipe line and a conveying fluid injected into the same detecting pipe line at a controlled flow rate, and also to a powder flow rate measuring apparatus in which the feed rate of a powder material can be adjustably controlled by adjusting the inlet or outlet pressure of a detecting pipe line.

To precisely measure the flow rate of a powder material conveyed by a fluid, is extremely important in various fields of industry such as feeding a powder material to reaction equipment, mixing equipment or the like, feeding a pulverized fuel to a burner, feeding a powder material in flame coating and powder painting, etc. The methods which have been heretofore practiced for achieving such objectives are generally grouped into the following three different methods:

(1) a method of estimating the flow rate of a powder material being conveyed on the basis of a preliminarily calibrated characteristic of the conveying apparatus;

(2) a method of introducing into a conveying apparatus a powder material whose flow rate has been preliminarily measured or estimated precisely; and (3) a method in which after a powder material has formed a two-phase flow, a value principally related to the flow rate of the conveying fluid and a value principally related to the proportion of the powder material are detected, and on the basis of a formula correlating the two valves a flow rate of the powder material is derived by calculation.

However, these known methods in the prior art involves many unresolved problems in respect to various points such as accuracy, the space for installation, cost, ease of use, reliability in operation of the apparatus, etc. as will be described later. Presently, practically useful powder flow rate measuring apparatus to be used with relatively small-sized and less expensive equipment such as, for example, a small-sized pulverized coal burner, flame coating equipment, powder painting equipment, etc. are very scarce.

Figure 14:
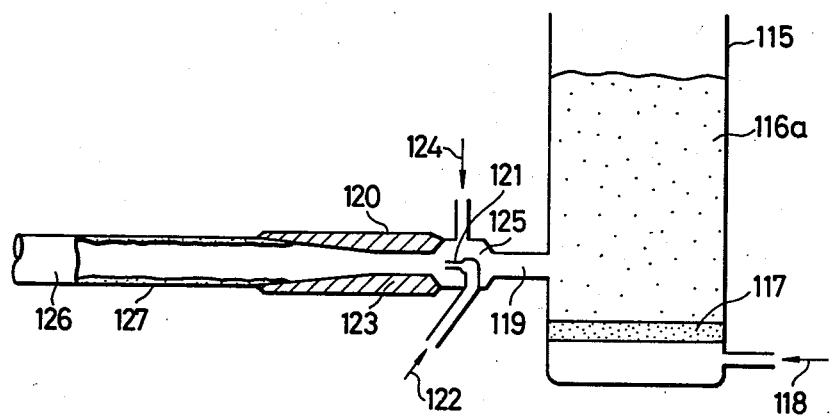

Among the above-referred prior art methods for estimating or measuring the flow rate of a powder material, a representative example of the method of estimating a flow rate of a powder material being conveyed on the basis of a preliminarily calibrated characteristic of the conveying apparatus is illustrated in FIG. 14. In this method, a powder material 116a fluidized by fluidizing air 118 supplied through a perforated plate 117 provided at the bottom of a powder tank 115 is introduced into an injector 120 through a powder introduction port 119 provided at a side wall of the powder tank 115. Then the powder material is accelerated through a throat 123 by the driving air 122 injected through a driving nozzle 121 of the injector 120 and a control air represented by arrow 124 for regulating the degree of vacuum in a mixing chamber 125, and the powder material is conveyed through a transport pipe 126 by the air. In such a case, by first conducting a test operation before initiating normal practical operation, the powder conveying characteristic of this system as a function of the powder level in the powder tank 115 and also as a function of flow rate or pressures of the driving air and the control air in the injector, can be preliminarily measured. Therefore, if the powder level in the powder tank is controlled to a certain extent by an automatic control apparatus (not shown) for the powder level in the powder tank, on the basis of the operating characteristic of the system obtained through the above-described test operation, in some cases, the flow rate of the powder material upon practical operation can be estimated in a fairly precise manner. However, in the event the powder material being conveyed is an adhesive material such as, for example, a certain kind of powder paint, since an internal deposit 127 is produced within the transport pipe 126 greatly varying the flow resistance of the transport pipe 126, often a large error will occur between the estimated flow rate of the powder material in the conveying system that has been preliminarily calibrated by a test operation and the actual flow rate of the powder material flowing through the transport pipe. Moreover, in such a case, most of the pipes forming the throat 123 are formed of a material having a non-adhering surface such as fluorine resin or the like. However, since materials such as fluorine resin or the like are not satisfactory in wear resistance, the inner diameter of the throat pipe 123 will vary after operation for a relatively short period; and due to this cause also, often a large error will be produced in the estimation of the powder flow rate during an actual operation based on the powder transport characteristic which has been preliminarily obtained by a test operation. Besides, in the case where the final end of the transport pipe 126 is, for example, an electrostatic powder gun for painting a large and long suspended body, as the level of the final end of transport pipe is changed over a wide range during the operation of the apparatus, the flow rate of the powder material is greatly varied also by the the pressure changes within the transport pipe caused by the level change. In such a case as a practical matter it becomes extremely difficult to effectively estimate the flow rate of a powder material being conveyed by a fluid on the basis of a preliminarily calibrated characteristic as illustrated in FIG. 14.

Figure 15:
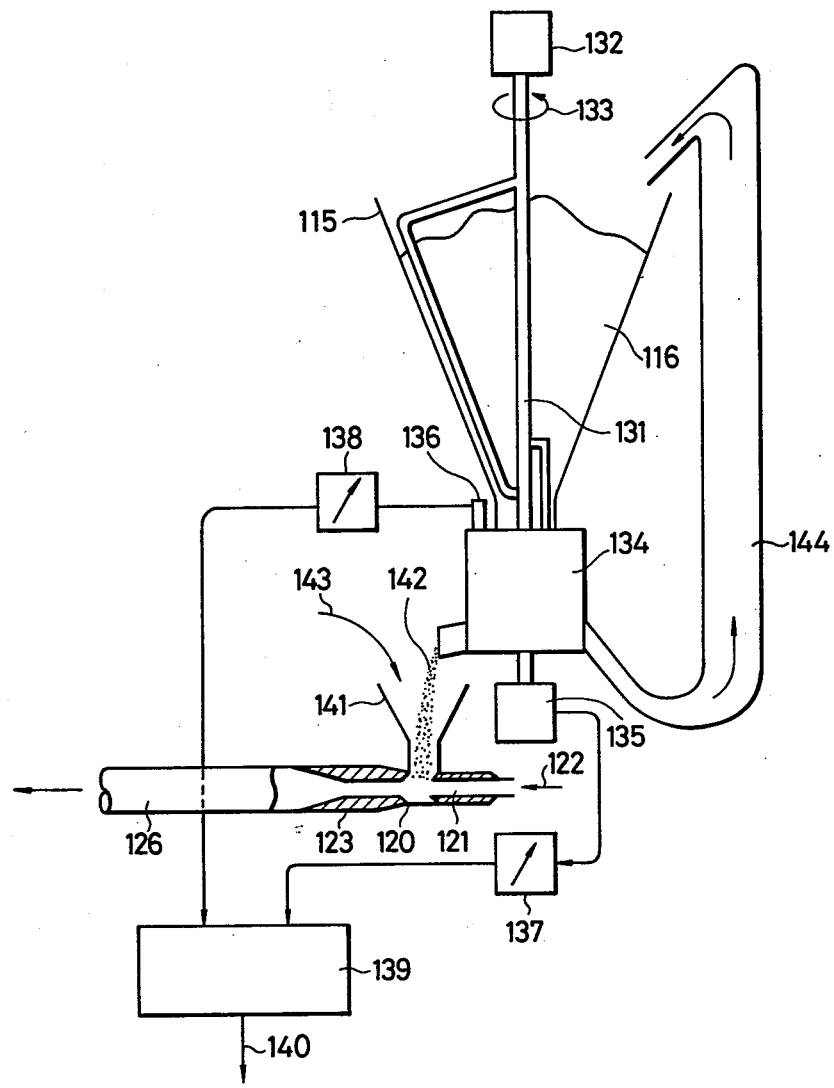

A method in which a powder material whose flow rate under a bulk condition has been preliminarily controlled in a precise manner is therafter fed into a transport pipe and conveying of the powder material through the transport pipe is effected by means of a fluid, is illustrated in FIG. 15. More particularly, in FIG. 15, a powder material 116 stored within a powder tank 115 is uniformly loosened by means of an agitator 131 driven by a driving device 132. The agitator achieves a stirring operation as indicated by an arrow 133, and then the powder material is supplied to a bulk powder feeding device 134 so that a uniformly packed condition may be realized. This bulk powder feeding device 134 is, for example, a table feeder driven by a feed driving device 135, in which the powder material is discharged each time in a precisely controlled volume by means of a release device 136. The powder is then sucked through a powder introducing open cone 141 into an injector 120 as released powder material 142, and is conveyed through a transport pipe 126 by the driving air 122 and injected through the injector nozzle 121. In such a case, since the powder flow rate can be largely estimated by means of the bulk powder feeding device 134 which can precisely determine the feeding rate on the basis of the volume of the bulk powder that has been preliminarily released, in most cases, the greater problems are not present with respect to measurement of a powder flow rate. However, the bulk powder feeding device used in such a case, in order to always precisely maintain the relationship between the volume of the released bulk powder and the flow rate, sometimes within the bulk powder feeding device 134 a portion of the powder is initially released in a separate direction. This powder is collected and reused by a powder feed-back device 144, and in this case there exists the disadvantage that the structure of the machine becomes so complex that the time required for restarting after a failure is likely to be extended. Thus, it is likely to become a serious cause of stoppage of a continuous mass-production line over a long period of time. In addition, in the table feeder which is mostly used as a bulk powder feeding device, in the case of an electrostatic powder gun or the like which is required to frequently repeat operation and stoppage in a short period of time, if the start and stop of the bulk powder feeding device 134 is effected by starting and stopping the driving device 135, then normally a large amount of powder material flows momentarily upon starting, and so, it is not suitable for such purposes. Accordingly, in the case of such a purpose, normally it is required that feeding and stopping of a powder material be effected by treating the selected powder material 142 with a switching damper while the feed driving device 135 is kept in operation and the selected powder material upon stoppage is fed back to the powder tank by means of a powder feedback device 144. Hence in such a case also the powder feedback device 144 becomes necessary, resulting in complexity of the apparatus, and so, jointly with the above-described problem of reliability in operation, this becomes a case of further increase in cost of the apparatus thus prohibiting application to a wide range. In addition, in such type of apparatus, normally the amount of discharged material 142 is controlled by both a drive signal 137 indicating rotational speed of the feed driving device 135 and a discharge signal 138 indicating a depth of the material discharged by the discharge device 136, so that in order to calculate a flow rate 140 of a powder material from these signals, an calculator unit 139 becomes necessary, and hence this also makes the apparatus complex and brings about an increase in the cost. Besides, in the system shown in FIG. 15, since the discharged powder material 142 is normally introduced into a transport pipe 126 through a powder introducing open cone 141 communicating with the environmental atmosphere, in the event that the pipe line resistance has been greatly increased due to formation of a deposit on the inside of the transport pipe 126 or, in the case of a transport pipe 126 made of a flexible tube, due to the fact that it is inadvertently bent or crimped, an accident would often occur such that the powder material to be charged through the powder introducing open cone 141 is, on the contrary, ejected jointly with the driving air injected into the injector 120, resulting in contamination of the environment of the apparatus, and so, in the field such type of problems become a cause of trouble that cannot be overlooked. In addition, since this type of apparatus is generally liable to become complexed in its mechanical structure, in the case where it is applied to a feed system for powder painting or the like in which it is required to frequently replace the powder material within the feeding apparatus, the time necessary for replacement of paint becomes extremely long, resulting in increase of an operation stop period, and in this respect also, the apparatus is liable to become a cause of manufacturing cost increase. As described above, the method of introducing a powder material into a transport pipe line after it has been preliminarily precisely measured as illustrated in FIG. 15 has various disadvantages with respect to occupation off space, cost, ease of in use, reliability in operation, etc. of an apparatus, and so, the scope of application of the method would be fairly limited.

Figure 16:
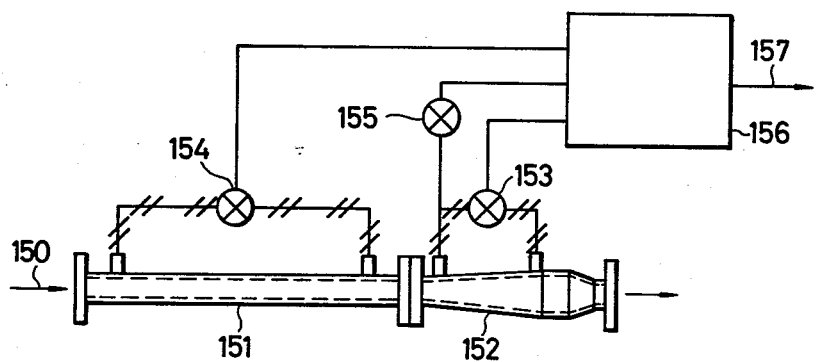

As a method for measuring the flow-rate of a powder material being conveyed by a fluid, the method illustrated in FIG. 16 which is normally called "a differential pressure type two-phase flow meter", has been known. In this method, after a powder material has mixed with a conveying fluid and has formed a two-phase flow 150, a mixing ratio detector 151 and a fluid flow rate detector 152 are serially inserted midway of a transport pipe. If such provision is made, the differential pressure generated in the fluid flow rate by the venturi type detector 152 is little related to a flow rate of the powder material coexisting in the two-phase flow 150 but principally related only to the flow rate of the conveying fluid. Hence this differential pressure is introduced into a flow rate differential pressure transducer 153, whereas the differential pressure generated in the mixing ratio detector 151 is related to both the flow rate of the conveying fluid and the mixing ratio of the powder material being conveyed by the conveying fluid to the conveying fluid. Hence the latter differential pressure is introduced into the mixing ratio differential pressure transducer 154, and further, since these two kinds of differential pressures are also related to the absolute pressure of the conveying fluid, this absolute pressure is detected by an absolute pressure transducer 155. The three kinds of signals produced by these three converters are then introduced into a calculator unit 136, where arithmetic operations are efffected according to a calculation formula that has been preliminarily determined through theoretical analysis and experiment, and thereby a powder flow rate output signal 157 can be obtained. As will be obvious from the above description, this method necessitates three kinds of transducers consisting of two differential pressure transducers and one absolute pressure transducer. Moreover it also necessitates a calculator unit, hence the apparatus becomes expensive. Thus, in the case where a large number of such measuring apparatuses must be employed in a small-sized apparatus, a very difficult problem would arise, and after all, the scope of application of the measuring apparatus would be considerably limited.

The present invention provides a measuring apparatus for the flow rate of a powder material being conveyed by a fluid, which can resolve the problems in the system for measuring or estimating the flow rate of a powder material being conveyed by a fluid according to the heretofore known methods as described in detail above, and which is simple in structure, less expensive, precise and easy in handling. Furthermore, the present invention provides a powder flow rate measuring apparatus which can, if necessary, adjust the flow rate of a powder material, or which can even achieve even automatic control by combination with a novel control device according to the present invention.

Figure 4:
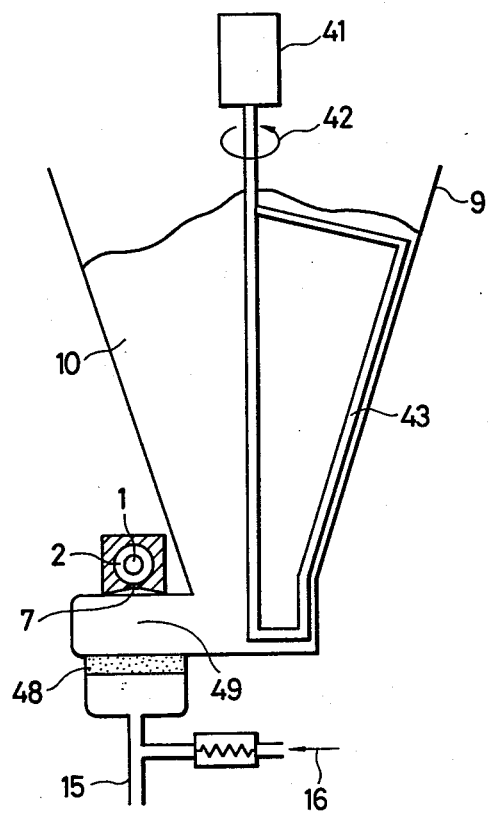
Figure 5:
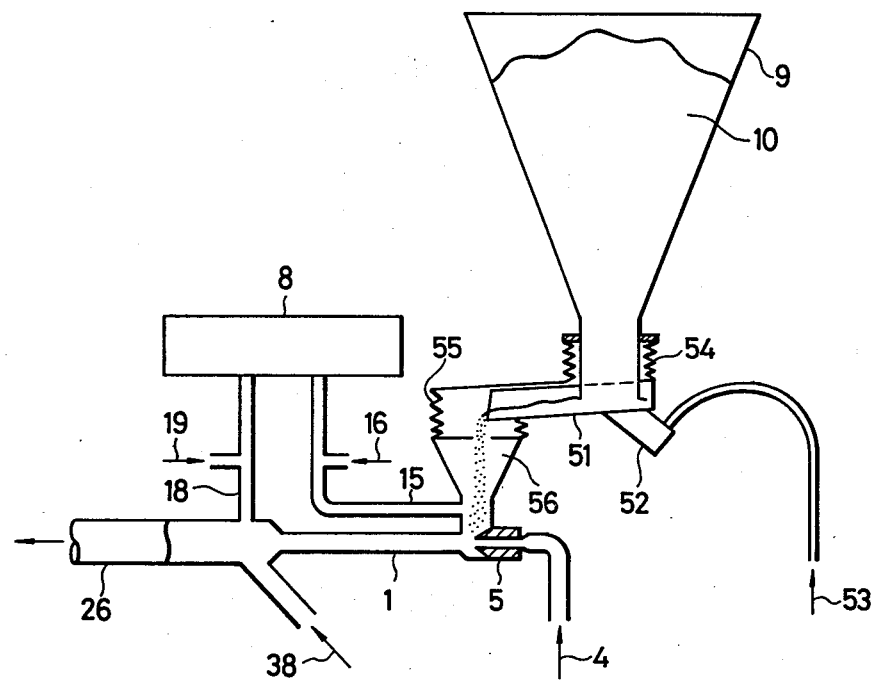
Figure 6:
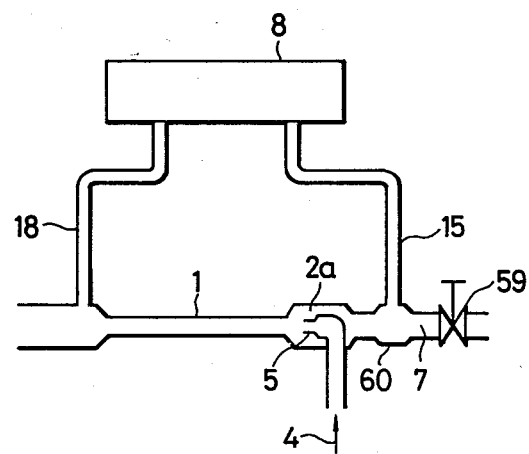
Figure 7:
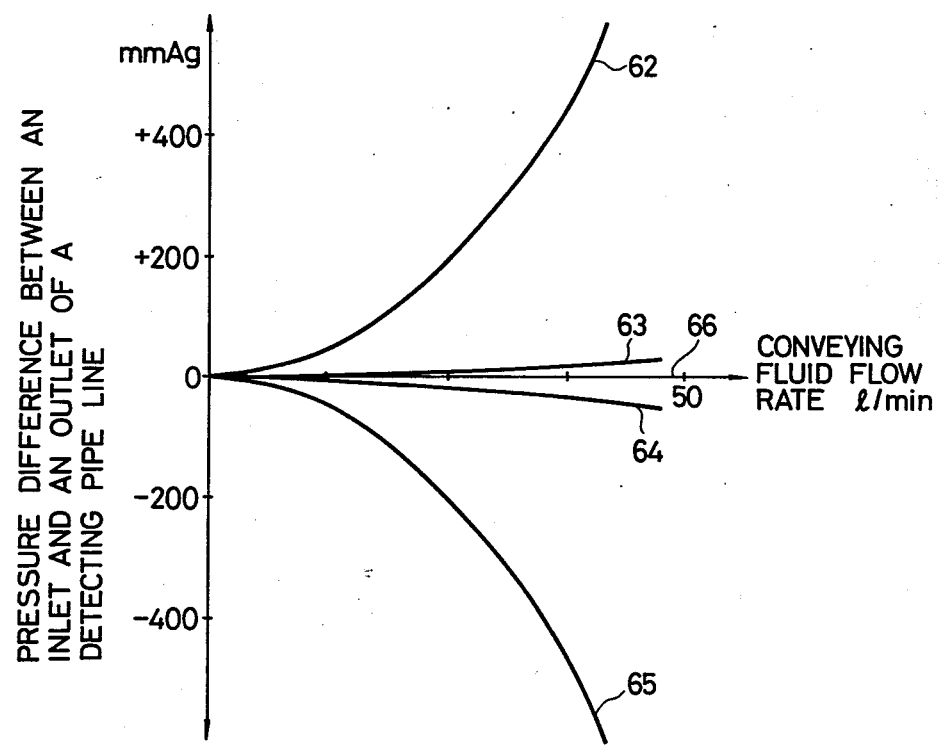
Figure 8:
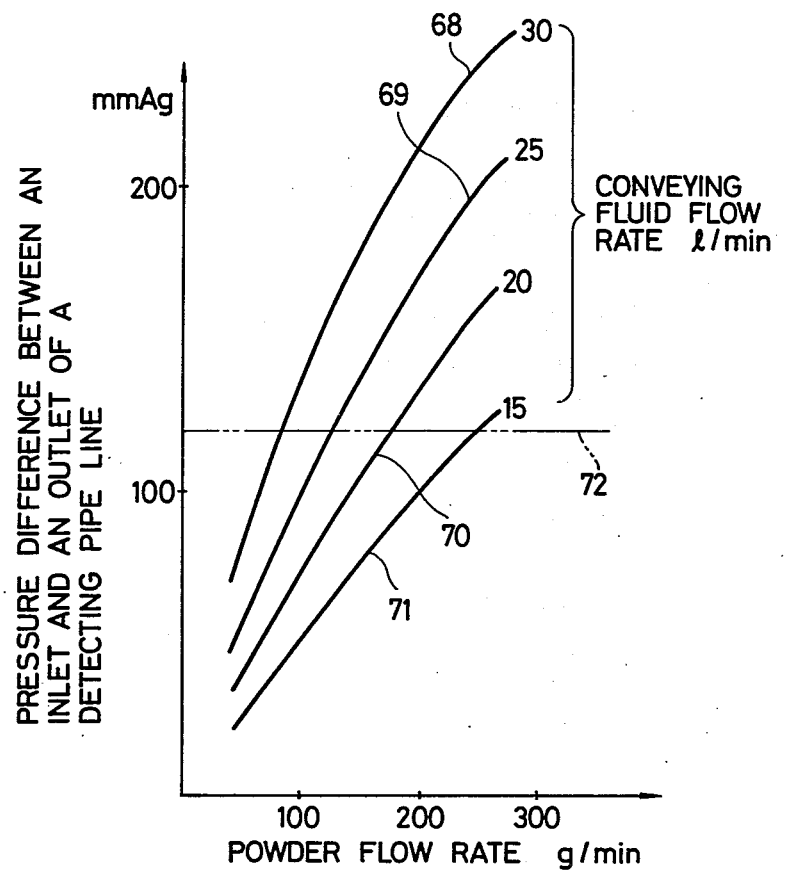
Figure 9:
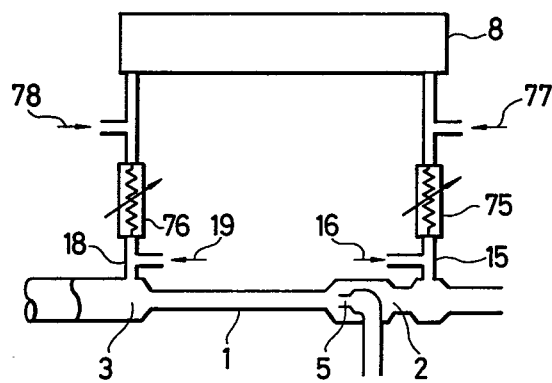
Figure 10:
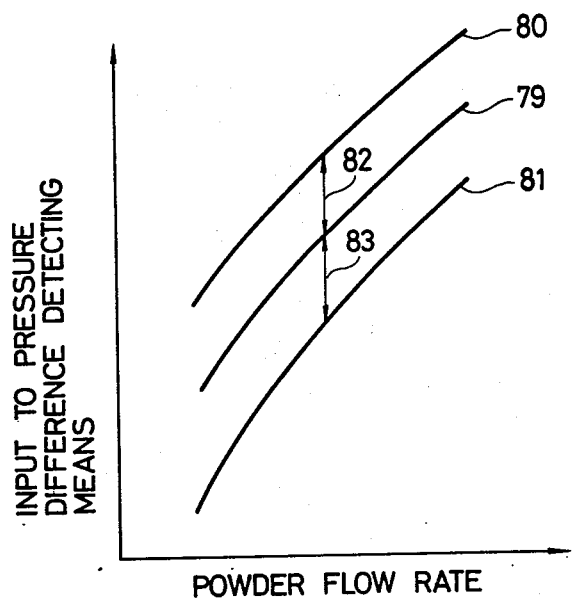

The objects, features and advantages of the present invention will be better understood from the following detailed description of the invention taken in conjunction with the accompanying drawings, wherein:

FIGS. 1 through 5, respectively, are cross-section schematic views showing different preferred embodiments of the present invention, FIG. 6 is a cross-section view showing a device forming a part of the apparatus shown in FIG. 1, FIG. 7 is a diagram showing characteristics of the device illustrated in FIG. 6, FIG. 8 is a diagram showing different characteristics of the same device, FIG. 9 is a cross-section view showing a device adapted to realize characteristic curves which are obtained by shifting in parallel the characteristic curves shown in FIG. 8, FIG. 10 is a diagram showing characteristics of the device illustrated in FIG. 9, FIGS. 11, 12 and 13, respectively, are cross-section views showing other different preferred embodiments of the present invention, and FIGS. 14, 15 and 16, respectively, are cross-section views showing representative examples of powder flow rate measuring apparatuses in the prior art.

Referring now to FIG. 1, at an upsteam side inlet of a detecting pipe line 1 there is provided a nozzle 5, and a conveying fluid denoted by an arrow 4 is injected through this nozzle 5 towards the detecting pipe line 1. The flow rate of this conveying fluid 4 is normally maintained always at a constant value by flow rate control means 6. This flow rate control means 6 could be simple means such as, for example, a device formed by providing a choke having a predetermined magnitude of fluid resistance at an outlet of a conventional precision type pressure regulating valve, and any means could be employed by which even if, for instance, the external pressure at the ejecting port of the nozzle should vary, the flow rate of the conveying fluid represented by the arrow 4 can be maintained at a constant value regardless of the external pressure variation. The upstream side inlet 2 of this detecting pipe line 1 communicates through powder introducing means 7 with a powder tank 9 of fluidized bed type, hence a fluidized powder material 10a existing within the powder tank 9 is fed into the detecting pipe line 1 through this upstream side inlet 2, then is mixed with a conveying fluid injected through the nozzle 5 and is made to flow towards an outlet 3 of the detecting pipe line 1. It is to be noted that at the bottom of the powder tank 9 a porous plate 11 is disposed, and the powder material within the powder tank is fluidized by a fluidizing fluid 13 that is injected from an external source through a high pressure chamber 12 and the porous plate 11. Downstream of the detecting pipe line outlet 3 and adjacent thereto, an injector 23 is connected that is adjacent thereto, which injector is composed of a nozzle 22 for injecting a driving fluid as denoted by an arrow 27 and a throat pipe 25. The degree of vacuum in a vacuum chamber 24 which is generated by the injector 23 is regulated by a regulating fluid denoted by an arrow 28, and the total flow rate of the air injected as indicated by arrows 27, 28 and 4, respectively, is defined so that the conveying speed of a powder material through the transport pipe 26 may take an appropriate value. It is to be noted that a drive control valve 29 is provided for the purpose of regulating the flow rate or pressure of the driving fluid, and a regulation valve 30 is provided for the purpose of regulating the flow rate or pressure of the regulating fluid 28. In the powder passageway defined by the above description, since the shape and size of the detecting pipe line 1 are kept constant and the condition maintained that all the conveying fluid injected through the nozzle 5 with its flow rate controlled can pass through the detecting pipe line 1, the pressure difference between the pressure at the detecting pipe line inlet 2 and the pressure at the detecting pipe line outlet 3 is determined only by the flow rate of the powder material introduced through the powder introducing means 7 to this pipe line 1.

Accordingly, if the pressure at the detecting pipe line inlet 2 is detected by inner pressure detecting means 14 and is transmitted through a high pressure side pressure transmission pipe 15 to the high pressure side of pressure difference detecting means 8, and if the pressure at the detecting pipe line outlet 3 is transmitted through a low pressure side pressure transmission pipe 18 to the low pressure side of the pressure difference detecting means 8, then the flow rate of the powder material can be determined solely by the pressure difference detecting means 8. It is to be noted that an arrow 16 represents a high pressure side purge fluid for always precisely measuring the inner pressure of the fluidized powder tank. Likewise, what is represented by an arrow 19 is a low pressure purge fluid that is injected towards the detecting pipe line outlet 3 through a low pressure side pressure transmission pipe 18 for the purpose of continuously and precisely measuring the pressure of the mixed flow of the conveying fluid and the powder material at the detecting pipe line outlet 3 over a long period of time. The flow rate of this low pressure side purge fluid 19 is always stably maintained at a predetermined small rate by means of a low pressure side purge fluid set 20.

In the preferred embodiment shown in FIG. 1 which is constructed as described in detail above, the total flow rate of the conveying fluid flowing through the transport pipe 26 is the total sum of the flow rates of the fluids represented by arrows 27, 28, 19 and 4, and with respect to this total flow rate there exists a proper range which is determined by the pipe line and the properties of the powder material to be conveyed. Therefore, in the case where it is desired to regulate only the flow rate of the powder material without varying this total flow rate of the conveying fluid, the degree of vacuum 24 in the vacuum chamber 24 of the injector 21 can be regulated mainly by varying the proportion of the driving fluid 27 and the regulating fluid 28 while maintaining the total flow rate thereof at a constant value. Also, since the flow rate of the conveying fluid as indicated by reference numeral 4 which is injected through the nozzle 5 is always kept constant by the flow rate control means 6, the flow rate of the powder material introduced into the detecting pipe line 1 through the powder introducing means 7 is increased by the amount corresponding to the lowering of the pressure at the detecting pipe line outlet 3 caused by the change of the degree of vacuum in the vacuum chamber 24 of the injector 21. Hence the flow rate of the powder material is increased by the amount corresponding to the generated increase of the pressure difference, and thus the feed rate of the powder material can be regulated in a simple manner by the above-mentioned process.

As will be apparent from the above description, it is very important for the long period continuous operation characteristics of this powder flow rate measuring apparatus that the inner diameter and length of the detecting pipe line 1 are always constant, and so, in the case where the powder material to be conveyed is an adhesive material such as, for instance, a certain kind of powder paint, the detecting pipe line 1 must be constructed of non-adhesive fluorine resin such as, for example, Teflon or the like, and the flow rate of the conveying fluid 4 flowing through the detecting pipe line 1 must be chosen such that the detecting pipe line 1 may resist wearing without changing its inner diameter over as long a period of time as possible. To prevent the inner diameter of the detecting pipe line 1 from varying due to adhesion of the powder material being conveyed onto the inner surface of the pipe line or, on the contrary, due to wearing of the inner surface the above-mentioned provisions, are an extremely important technique for practicing the present invention. For instance, in the case where powder paint having a relatively strong sticking tendency is made to flow at a rate of several tens of grams to several hundreds of grams per minutes and the flow rate is to be measured, fluorine resin such as Teflon or the like is used as the material of the detecting pipe line, while the flow speed of the conveying fluid flowing through this detecting pipe line is maintained in the range of about 10–14 m/sec, and thereby stable continuous measurement over several hundreds hours can be easily realized. However, in the event that continuous operation over a longer period of time is necessitated, it is preferable to use an apparatus structure such that the detecting pipe line only can be easily replaced after operation for a predetermined period of time. In the event that a powder material having such a high hardness that it is liable to wear the pipe line, preferably the detecting pipe line 1 is made of a wear-resisting material having a high degree hardness such as superhard alloy or ceramics.

In the powder flow rate measuring apparatus according to the present invention as shown in FIG. 1, it is an essential condition for completing this powder flow rate measuring apparatus that all the conveying fluid 4 having a flow rate controlled by the flow rate control means 6 should pass through the detecting pipe line 1 and substantially no other fluid should be introduced into this pipe line. To that end, it is necessary that the flow direction of the conveying fluid injected through the nozzle 5 be principally composed of a component of the same direction as the detecting pipe line 1, and in the preferred embodiment shown in FIG. 1 the direction of the detecting pipe line and the direction of injection by the nozzle coincide with each other. At the same time, in order to establish the condition that only the conveying fluid injected through the nozzle 5 and the powder material can flow through the detecting pipe line, it is necessary that the inlet of the detecting pipe line 1 communicate with only the fluidized powder material 10a within the powder tank 9, and further it is necessary that under an operating condition the conveying fluid 4 injected through the nozzle 5 should not flow backwards into the fluidized powder material 10a within the powder tank 9.

In order to fulfil this condition, in the case where the powder introducing means 7 is closed and only the conveying fluid 4 is made to flow through the detecting pipe line, it is desired that the pressure difference between the inlet 2 and the outlet 3 of the detecting pipe line 1 be very small, and preferably close to 0. In other words, in the normally often observed case such as, for instance, the case of a powder feed system for an electrostatic powder painting apparatus where the outlet of the transport pipe 26 has substantially the same pressure as the free surface of the fluidized powder 10a in the powder tank 9 in FIG. 1, in order that the aforementioned condition can be fulfilled, that is, the entire conveying fluid 4 injected through the nozzle 5 can flow into the detecting pipe line 1 without flowing back towards the fluidized powder material within the powder tank 9 and suck an extremely small amount of powder material over as wide a range as possible of the amount of the powder material within the powder tank 9, that is, even when the surface 31 of the fluidized powder 10a within the powder tank 9 becomes lowest and falls to the neighborhood of the powder introducing means 7. Under such an operating condition it is preferable that the pressure at the detecting pipe line inlet 2 be 0 when the flow rate of the conveying fluid controlled by the flow rate control means 6 is set at the highest level. This is because if the pressure at the detecting pipe line inlet 2 is higher than the atmospheric pressure under the above-mentioned condition, the conveying fluid injected through the nozzle 5 would flow back towards the powder material 10a within the powder tank under such a condition. On the contrary, if the conveying fluid injected through the nozzle 5 reveals an injector effect and thus the pressure at the detecting pipe line inlet 2 is lower than the atmospheric pressure, it becomes difficult to stably set a powder flow rate at a low level. Especially, in the case where the grain size of the powder material within the powder tank 9 is coarse, the atmospheric air is sucked through the interstices between the grains of the powder material, and as a result, the condition that the fluid flowing through the detecting pipe line 1 should be only the conveying fluid, is not fulfilled.

Practical means for minimizing the pressure difference between the inlet and outlet of the detecting pipe line in the case where a conveying fluid is made to flow through the detecting pipe line as described in detail above, is illustrated in FIGS. 6 and 7. FIG. 6 is created by selecting only the detecting pipe line 1 and its inlet and outlet, the differential pressure gauge 8, the pressure transmission pipes 15 and 18 and the powder introducing means 7 from FIG. 1, and adding a valve 59 upstream of the powder introducing means 7. FIG. 7 shows typical examples of the influences in the event that the fluid resistance of the detecting pipe line and the diameter of the nozzle 5 are varied, taking the flow rate of the conveying fluid in FIG. 6 along the abscissa and taking the pressure difference between the inlet and outlet of the detecting pipe line 1 which can be detected by the pressure difference detecting means 8 along the ordinate. More particularly, in the case where the diameter of the nozzle 5 is too large as compared to the fluid resistance of the detecting pipe line 1, as represented by characteristic curve 62 in FIG. 7, the pressure difference between the inlet and outlet of the detecting pipe line 1 rises abruptly in the positive direction, that is, in the direction of the pressure at the inlet rising as the flow rate of the injected conveying fluid 4 increases, whereas in the case where the injection port diameter of the nozzle 5 is too small as compared to the fluid resistance of the detecting pipe line 1, then owing to the suction effect of the detecting pipe line 1 and the nozzle 5, the pressure at the detecting pipe line inlet 2a decreases abruptly, that is, the degree of vacuum at the inlet 2a increases abruptly, as the flow rate of the injected conveying fluid 4 increases, and thus a characteristic curve as denoted by 65 in FIG. 7 can be obtained.

Accordingly, for a given fluid resistance, if an appropriate nozzle diameter coresponding to a characteristic curve between the characteristic curves 62 and 65 is selected, then a combination of the fluid resistance of the detecting pipe line and a nozzle diameter having such characteristic even when the flow rate of the conveying fluid 4 is varied from 0 over a considerably wide range, the pressure difference detected by the pressure difference detecting means 8 can be obtained very close to zero as represented by characteristic curves 63 and 64, and eventually it is possible to select a combination for which the pressure difference between the inlet and outlet of the detecting pipe line is almost equal to 0 regardless of the flow rate of the conveying fluid as represented by characteristic curve 66. The above-mentioned appropriate combination of the fluid resistance and the nozzle diameter realizes the condition where the pressure difference between the inlet and outlet of the detecting pipe line has been minimized. In the case where the pressure difference between the inlet and outlet of the detecting pipe line when only the conveying fluid is made to flow through the detecting pipe line is minimized, in addition to the advantages that the measurable range of the powder flow rate measuring apparatus becomes wide and design and operation of the entire system including the powder conveying means are facilitated as described in detail above, another important advantage is that the pressure distribution within the detecting pipe line inlet as shown at 2a in FIG. 6 becomes uniform, so that the pressure difference detecting characteristic of the detecting pipe line becomes less liable to be influenced by the powder material adhered and accumulated on the inner surface of the detecting pipe line inlet 2a. Hence, to minimize the pressure difference between the inlet and outlet of the detecting pipe line, provides an extremely favorable condition in most applications of the present invention.

A phenomena often observed is that the pressure difference between the inlet and outlet of the detecting pipe line will become unstable due to adhesion of the powder material to the neighborhood of the nozzle or detecting pipe line inlet. As a counter-measure for this phenomena, in some cases, the detection of the inlet pressure can be better executed by providing a separate pressure detecting chamber 60 that communicates with the detecting pipe line as shown in FIG. 6 and detects the pressure at this chamber rather than directly detecting the inlet pressure at the neighborhood of the detecting pipe line inlet or nozzle. In the event that the combination of the fluid resistance of the detecting pipe line 1 and the nozzle diameter is such as to create the characteristic curve 62 in FIG. 7, the conveying fluid injected from the nozzle 5 becomes liable to flow back towards the powder tank, hence the available operation range becomes narrow, and therefore, this is a condition generally favorable. On the contrary, in the event the diameter of the nozzle 5 is too small with respect to the fluid resistance of the detecting pipe line and thus the characteristic curve shown at 65 in FIG. 7 is observed, then owing to an injector effect produced by the detecting pipe line and the nozzle 5, the powder flow rate measuring apparatus in itself would have a characteristic of being liable to suck the powder material, and hence, often it becomes difficult to measure a very small feed rate of the powder material, which is generally not favorable. However, even in the case of presenting the characteristic curve 62 or 65, sometimes the apparatus can be effectively utilized for special applications.

FIG. 8 shows representative examples of the relation between the powder flow rate and the output of the flow meter, that is, the pressure difference between the inlet and outlet of the detecting pipe line, in the case where in the powder flow rate measuring apparatus according to the present invention as described in detail above and shown in FIG. 1, the pressure difference between the inlet 2 and outlet 3 of the detecting pipe line 1 when only the conveying fluid is made to flow therethrough has been minimized. In FIG. 8, along the abscissa is taken a powder flow rate represented, for example, by a conveyed amount in grams of the powder for each minute, and along the ordinate is taken a pressure difference between the inlet 2 and outlet 3 of the detecting pipe line 1 represented in mm Aq. The illustrated four different characteristic curves show how the characteristic of the flow meter varies depending upon the flow rate of the conveying fluid injected through the nozzle 5.

In FIG. 8, what is to be noted first is that since the pressure difference across the detecting pipe line 1 in the case of the conveying fluid flowing therethrough is only very small, for every characteristic curve the output of the flow meter becomes nearly 0 when the flow rate of the powder material is reduced to 0, and thus all the characteristic curves converge to the origin of the characteristic diagram. This is an extremely favorable property for a meter. As will be apparent from FIG. 8, the output sensitivity of the meter can be adjusted by regulating the flow rate of the conveying fluid, and this is very convenient for indexing a meter. Also, in the case of applying the output signal of the flow meter in itself to a powder flow rate control apparatus, powder flow rates given a fixed pressure difference output can be realized only by switching the flow rate of the conveying fluid as shown by a double-dot chain line 72 in FIG. 8, hence change of a set value for a feed rate of the powder material can be achieved by varying the flow rate of the conveying fluid without varying a set valve of the pressure difference regulating device, and so, when remote control is to be carried out, since it is only necessary to regulate the flow rate of the conveying fluid, the apparatus becomes very simple and thus affords great practical convenience. In summary, as seen from FIG. 8, every one of a family of characteristic curves identified by different parameters consisting of the flow rates of the conveying fluid nearly passes through the origin of the characteristic diagram when the powder flow rate is 0, and in the case where a particular flow rate of the conveying fluid has been selected, as represented, for example, by characteristic curve 71, the output of the differential pressure gauge would increase substantially in a linear from as the flow rate of the powder material increases, hence the output sensitivity of the flow meter can be adjusted over a considerably wide range by successively switching the flow rate of the conveying fluid, for example, in the increasing sequence of the characteristic curves 70, 69 and 68. This is a very convenient characteristic for a measuring apparatus.

In the event that the pressure difference detecting means 7 is of the so-called electric type in which the input differential pressure of the fluid is converted into an electric signal, it is very easy to adjust the output sensitivity as well as the null point. However, in the case where the present invention is applied to a powder material processing apparatus in which the conditions of being essentially sate and explosion-proof and the like are required, it is preferable to execute every operation such as detection of a pressure, generation of a signal, signal transmission, control, etc. by means of a fluid signal. Then, often the cost of the apparatus also can be reduced. It is one characteristic feature of the present invention that in such a case, the sensitivity of the flow meter can be adjusted in a simple manner, for instance, by regulating the flow rate of the conveying fluid. In some cases, it becomes necessary to shift in parallel the characteristic curves for the purpose of adjusting not only the sensitivity of the meter but also the null point thereof, through only manipulation of fluid signals such as, for instance, a compressed air pressure or the like, and a device for realizing this is illustrated in FIG. 9. The mode of shifting in parallel a characteristic curve by means of this device is shown in FIG. 10.

In the device shown in FIG. 9, a high pressure side setting fluid resistor 75 is serially inserted between a high pressure side transmission pipe 15 of the detecting pipe line 1 and the pressure difference detecting means 8. A high pressure side purge fluid 16 is introduced as shown by an arrow 16 between the high pressure side setting fluid resistor 75 and the detecting pipe line inlet 2. A high pressure side setting fluid 77 is introduced as shown by an arrow 77 between the pressure difference detecting means 8 and the high pressure side setting fluid resistor 75. Likewise, in FIG. 9, if necessary, a low pressure side purge fluid introduction port as denoted by an arrow 19, a low pressure side setting fluid resistor 76 and a low pressure side setting fluid introduction port as denoted by an arrow 78 are successively connected to a low pressure side pressure transmission pipe 18 at the detecting pipe line outlet 3, and thereby transmission of a pressure is effected.

In FIG. 9, if the fluid resistances of the fluid resistors 75 and 76 are 0 and the flow rates of the setting fluids 77 and 78 are both 0, the construction of the system shown in FIG. 9 is substantially identical to that shown in FIG. 6. In the event that the characteristic curve under such a condition is a curve 79 in FIG. 10 and if it is assumed that the high pressure side setting fluid 77 is made to flow and the pressure drop across the high pressure side setting fluid resistor 75 results in a differential pressure equivalent to that represented by arrows 82 in FIG. 10, then the sum of the differential pressure across the detecting pipe line 1 and the differential pressure across the high pressure side setting fluid resistor 75 would be applied to the pressure difference detecting means 8, and therefore, a characteristic curve 80 formed by shifting in parallel the original characteristic curve 79 in FIG. 10 by an amount represented by the arrows 82, can be realized. Likewise, if the low pressure side setting fluid resistor 76 is made effective and the differential pressure appearing across this fluid resistor 76 is made equivalent to the amount represented by arrows 83 in FIG. 10, then the input to the pressure difference detecting means 8 in FIG. 9 becomes equal to the difference of the pressure difference across the detecting pipe line 1 minus the differential pressure represented by arrows 83, and so, the characteristic curve 79 in FIG. 10 has been now shifted in parallel up to a curve 81. In this way, the characteristic curve can be easily shifted in parallel by inserting setting fluid resistors serially in the high pressure side pressure transmission pipe 15 and the low pressure side pressure transmission pipe 18, respectively, and generating differential pressures across these fluid resistors. Thereby adjustment of a null point of a flow meter as well as parallel displacement of characteristic curves thereof can be easily realized.

As described in detail above, in the powder flow rate measuring apparatus according to the present invention, adjustment of a pipe line as well as a null point of the flow meter can be easily achieved over a wide range by means of a combination only of a conveying fluid and a fluid resistor. Therefore, in the case where an essentially safe and explosion-proof structure is required as in the case of apparatuses for handling ignitable powder materials as is the case with a powder fuel such as pulverized coal, a powder paint, etc., the requirement can be easily realized at a low cost by means of an apparatus having a simple structure. This is one of the characteristic advantages of the present invention.

As described in detail above with reference to FIG. 1, the powder flow rate measuring apparatus according to the present invention is composed of only components having an extremely simple structure such as a single detecting pipe line, a single conveying fluid injecting nozzle and single pressure difference detecting means, and accordingly, the apparatus is, as a whole, very compact, simple and less expensive. Furthermore, since the measured input-output pressure difference across the detecting pipe line 1 is the result of detection of a change in a density of the two-phase flow caused by the powder material contained in the conveying fluid, the attained measured value is essentially close to a mass flow rate of the powder material. This is an essentially great advantage of the powder flow rate measuring apparatus according to the present invention over the previously described methods in the prior art which make use of a volume type precision powder feed apparatus or the like.

In addition, as described in detail above with reference to FIGS. 6, 7 and 8, the characteristic curves representing the relation of the output of the flow meter versus the flow rate of the powder material normally pass through the origin of the characteristic diagram, and are considerably close to linear characteristics. This is an extremely useful characteristic upon visual observation as well as automatic control, and so, it is an essentially excellent characteristic for a measurement instrument. Also, as explained above with reference to FIGS. 9 and 10 jointly, according to one characteristic feature of the measuring apparatus, adjustment of a pipe line, parallel displacement of characteristic curves and adjustment of a null point can be achieved in a simple manner, if necessary, by means of only devices relating to a conveying fluid without employing an electric device. This is an extremely advantageous feature in an apparatus for handling a powder material having explosiveness and ignitability. Normally, the above-mentioned powder flow rate measuring apparatus can continuously provide a measurement precision of 1-2.5% over a long period of time. As described in detail above, the powder flow rate measuring apparatus can be advantageously applied to a very wide range of objects.

Figure 2:
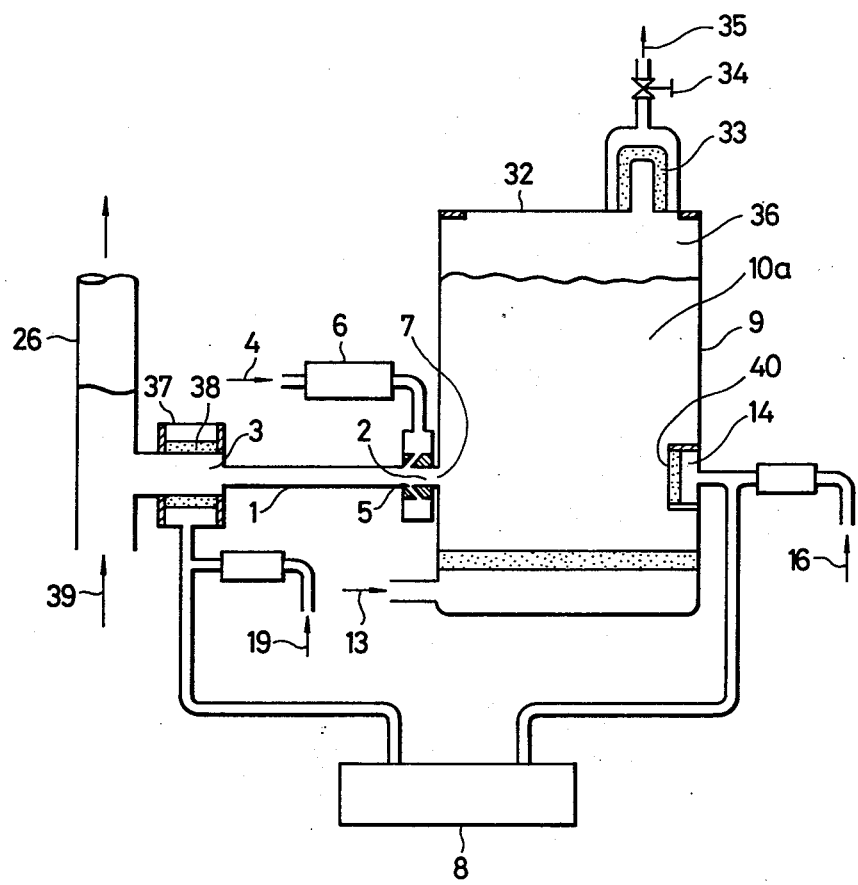

Another preferred embodiment of the powder flow rate measuring apparatus according to the present invention is illustrated in FIG. 2. In this figure, means having the same functions as those shown in FIG. 1 are given like reference numerals. Likewise, in every figure showing another preferred embodiment of the present invention, component parts which can achieve the same functions are, in principle, denoted by like reference numerals.

In the preferred embodiment shown in FIG. 2, a conveying fluid 4 to be injected into a pipe line 1 is injected through a nozzle 5 that is inclined with respect to the axial direction of the detecting pipe line 1 via flow rate control means 6. In this instance, the nozzle 5 could be either a single hole or a plurality of holes, or else it could be a ring-shaped injecting hole. In any event, by employing an appropriate combination of the fluid resistance of the detecting pipe line 1 and the inclination angle, aperture diameter and number of nozzles, one can obtain a combination of a detecting pipe line and nozzle which has a characteristic relationship of the powder flow rate versus the differential pressure output that is adapted for the respective objects of use as shown in FIG. 7. As compared to the type of nozzle shown in FIG. 1 in which the detecting pipe line and the nozzle are coaxially disposed, in the nozzle of the type shown in FIG. 2 there is provided a simple passageway for the powder material in which the shape of the portion through which the powder material passes is a simple cylindrical shape, and therefore, in the case where different kinds of powder materials are successively made to pass through the passageway as is the case with a feed device for powder painting, the nozzle structure shown in FIG. 2 would have an excellent characteristic depending upon the object of application because cleaning of the interior of the nozzle can be achieved in a simple manner.

In the apparatus shown in FIG. 2, detection of the pressure at the detecting pipe line inlet is effected by tank inner pressure detecting means 14 disposed at a different position in the powder tank but at the same level as the pipe line inlet while a high pressure purge fluid 16 is made to flow through a porous plate 40. On the other hand the detecting means for the pressure at the detecting pipe line outlet 3 is constructed such that a pipe 38 made of a porous material is provided in the neighborhood of a detecting pipe line output 3 and detection of the pressure is effected while a purge fluid 19 is being made to flow through the perforated material at a predetermined very small rate. It is to be noted that a reference numeral 37 designates a cover for the porous pipe 38.

In FIG. 2, reference numeral 9 designates a fluidized bed type powder tank that is essentially similar to that shown in FIG. 1, in which a fluidized powder material 10a is stored. This powder tank is a closed type of tank having a closure 32, in which a part of the air 13 blown into the tank for the purpose of fluidizing the powder material and the high pressure side purge fluid 16 is discharged externally of the system as indicated by an arrow 35 through a filter 33 while the flow rate thereof is being regulated by a valve 34. Owing to such provision, the pressure in the space 36 within the tank 9 can be freely regulated by adjusting the leak or discharge valve 34, and hence, the flow rate of the powder material introduced into the detecting pipe line 1 through powder introducing means 7 can be thereby regulated. Such a method for regulating the feed rate of a powder material is conveniently applied to the case where the pressure of the fluid 39 flowing through the transport pipe 26 is greatly different from the atmospheric pressure.

Figure 3:
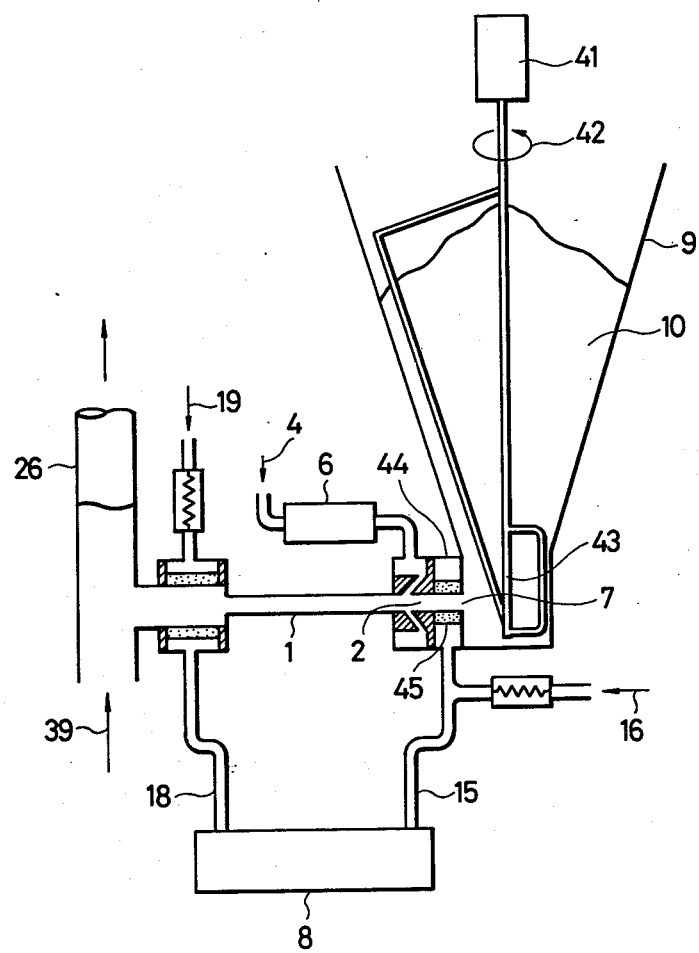

Still another preferred embodiment of the present invention is illustrated in FIG. 3, in which what is greatly different from the preferred embodiments shown in FIGS. 1 and 2 is that the powder material 10 within the powder tank 9 is not fluidized but is present in a bulk state. The present invention is easily applied even to such a case. As shown in FIG. 3, a stirring blade or spring 43 is disposed within the powder tank. Since this stirring spring 43 driven by a stirrer driving device 41 as shown by an arrow 42 is stirring as driven by a stirrer driving device 41, the powder material 10 within the powder tank 9 the powder material is always moderately stirred and continuously reaches powder introducing means 7 disposed at the inlet of the detecting pipe line 1 in a loosened condition, and thereby it is fed to the detecting pipe line 1. In the vicinity of the powder introducing means 7 a pressure detecting set 44 is provided adjacent thereto, and the pressure at the detecting pipe line inlet is transmitted via a high pressure side pressure transmission pipe 15 to pressure difference detecting means 8 while a high pressure side purge fluid 16 is being fed through a pipe 45 made of a porous material and disposed within the pressure detecting set 44. The introduction and measurement of the pressure at a detecting pipe line outlet is similar to that in the embodiment shown in FIG. 2. It is to be noted that in the case of introducing a powder material into a detecting pipe line from a powder tank in a bulk state as is the case with the embodiment shown in FIG. 3, during the period when the feed of the powder material is stopped, in most cases it is better to stop feeding of at least the high pressure side purge fluid that is used for the purpose of detecting the pressure at the detecting pipe line inlet. This is done for the purpose of preventing the high pressure side purge fluid from flowing back to the powder tank in a bulk state. In addition, for a similar purpose, in some cases it is better to also stop feeding of the low pressure side purge fluid 19 as synchronized with the high pressure side purge fluid 16. In addition, depending upon the pressure of the transport fluid 39 flowing through the transport pipe 26, during stoppage of feeding of the powder material, normally a valve is inserted between the detecting pipe line 1 and the transport pipe 26 to thereby isolate the detecting pipe line 1 from the transport pipe 26 and also cut off the conveying fluid represented by an arrow 4 in the case of not effecting measurement of the flow rate of the powder material. In this preferred embodiment of the present invention illustrated in FIG. 3, since the high pressure side purge fluid 16 flows jointly with the conveying fluid 4 through the detecting pipe line 1, in the case where the flow rate of the purge fluid 16 is relatively large, control for that flow rate equivalent to that achieved by the flow rate control means 6 for the conveying fluid 4 is necessary.

FIG. 4 shows a still further preferred embodiment of the present invention that is somewhat different from the embodiment shown in FIG. 3, as applied to a powder tank 9 containing a powder material 10 in a bulk state similarly to that shown in FIG. 3. It is similar to the embodiment shown in FIG. 3 in that the powder material 10 in a bulk state contained within the tank 9 is stirred by a stirring blade 43 driven by a stirrer driving device 41 as indicated by an arrow 42 and is thus brought to the bottom of the tank in a well loosened state. In FIG. 4, reference numeral 1 designates a detecting pipe line as viewed in the axial direction. Reference numeral 2 designates an inlet of the detecting pipe line 1, which inlet communicates with the bottom portion of the tank 9 via powder introducing means 7. In the proximity of the communicating portion between the bottom portion of the tank 9 and the powder introducing means 7, a small porous plate 48 is provided at the bottom. A high pressure side purge fluid 16 is introduced to the bottom portion of the tank through this porous plate 48, and thereby an introducing/fluidizing tank 49 for introducing a powder material is partly formed just in front of the powder introducing means 7.

Owing to such provision, in some cases, introduction of a powder material from a tank in a bulk state into the detecting pipe line according to the present invention can be smoothly achieved. It is to be noted that in this preferred embodiment, the structure at the bottom of the tank is constructed in such manner that the high pressure side purge fluid 16 to be used for forming the introducing/fluidizing tank may be entirely sucked into the detecting pipe line 1 as a conveying fluid flowing therethrough.

The thus detected pressure at the inlet of the detecting pipe line is led through a pressure transmission pipe 15 to the high pressure side of pressure difference detecting means, while the low pressure side of the pressure difference detecting means is constructed similarly to that shown in FIG. 3, and with regard to the relationships between the start-stop of the detecting fluid and purge fluid and the transport pipe, the same measures as those described with reference to FIG. 3 are necessary.

In a preferred embodiment as illustrated in FIG. 4, in the case where the subject powder material is an inadhesive powder material such as polyethylene and the powder flow rate is large, only the fluid fed through the porous plate 48 is sufficient as a conveying fluid, and hence in some cases, it is not necessary for generating a predetermined pressure difference across the detecting pipe line 1 and maintaining the shape and size of the detecting pipe line 1 constant to inject a conveying fluid through a nozzle 5 as shown in FIGS. 1, 2 or 3. In such a case, the high pressure side purge fluid 16 achieves substantially the same function as the nozzle 5, and so, it becomes necessary to provide means for controlling the flow rate at a predetermined value. Accordingly, the term "nozzle" as used throughout this specification should include every conveying fluid feed means provided with means capable of controlling the flow rate of a conveying fluid flowing through the detecting pipe line 1 while conveying a powder material substantially at a known value, and it does not mean only the nozzle in the form of the conventional fluid ejecting device as shown in FIGS. 1, 2 and 3.

Yet another preferred embodiment of the powder flow rate measuring apparatus according to the present invention is illustrated in FIG. 5. This preferred embodiment can bring about a favorable result when it is applied to the case where the specific gravity of a powder material is relatively large and the grain size of the powder material is relatively coarse as is the case with metallic powder for use in flame coating. In the case of such powder materials, a favorable result can be brought about when the fluidizing of the powder material is difficult and also introduction of the powder material is hardly adhieved in a smooth manner with the powder introducing means as shown in FIGS. 1 to 4.

With reference to FIG. 5, a powder material 10 in a bulk state stored within a powder tank 9 enters a powder introducing cone 56 while passing over a tray 51 which is vibrated by a vibrator 52, then it merges with a conveying fluid 4 injected into a detecting pipe line 1 through a nozzle 5, and they jointly pass through the detecting pipe line 1. In this instance, the bottom portion of the powder tank 9 and the tray 51 are sealingly coupled by means of a sealing member 54, while the powder introducing cone 56 and the tray 51 are sealingly coupled by means of a sealing member 55, and so, these parts are constructed so that the the powder introducing cone and tray may not communicate with the external environment. Owing to such provision, only the powder material discharged by the vibrator 52 and conveying fluid 4 can flow through the detecting pipe line 1, so that the principle of the present invention can be precisely realized and measurement of the powder flow rate can be achieved. It is to be noted that reference numeral 15 designates a high pressure side pressure transmission pipe, while the reference numeral 18 designates a low pressure side pressure transmission pipe, and by means of these pressure transmission pipes, a pressure difference that is solely related to the powder flow rate can be always transmitted to pressure difference detecting means 8 stably over a long period of time with the aid of the purge fluids 16 and 19. In addition, in FIG. 5 reference numeral 53 also designates a device for feeding a driving fluid 53 for driving the vibrator 52. Also a transport pipe 26 necessitates, in some cases, pressure regulating means responsive to the pressure difference generated across the detecting pipe line 1 by the feeding of the powder material and means for feeding conveying air 58 that is necessary for maintaining a flow speed at an appropriate value, and the like.

In the preferred embodiments illustrated in FIGS. 1, 2, 3, 4 and 5 and described above, a part of a conveying fluid to be used for conveying a powder material is divided and made to flow through a detecting pipe line, and a flow rate of the powder material is detected by making use of the pressure difference appearing across the detecting pipe line. However, the present invention should not be limited to such type of embodiments, but an embodiment in which the total amount of the air to be used for conveying a powder material is passed through a detecting pipe line and the flow rate of the powder material is detected on the basis of a pressure difference generated across the detecting pipe line, should be also included within the scope of the present invention.

Figure 12:
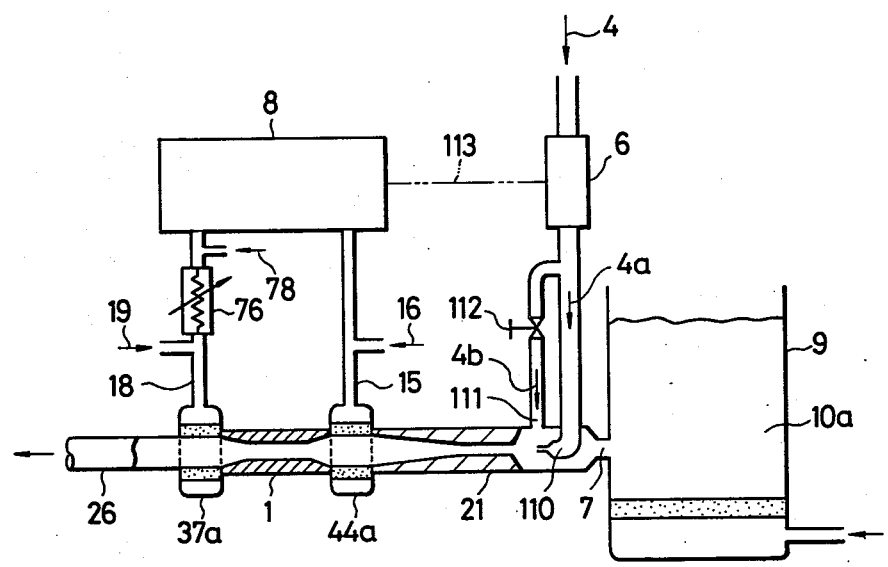

FIG. 12 shows one example of the latter type of embodiment, in which a fluidized powder material 10a contained in a powder tank 9 is sucked out by means of an injector 21 to be conveyed through a pipe line 26. In this instance, the total flow rate of the conveying fluid 4 fed to the injector 21 is controlled at a fixed value by flow rate control means 6. A portion 4a of this conveying fluid 4 is injected through a main nozzle 110 to serve as driving air of the injector 21, while the remainder serves as a regulating fluid 4b for the injector 21 to be used for regulating the suction force of the injector 21, and these portions of the air are both made to flow through a transport pipe 26 via a throat of the injector 21. In the arrangement shown in FIG. 12, a detecting pipe line 1 is connected downstream of and in series with the injector 21. A series thereto, a high pressure side pressure detector 44a is connected to the upstream end of the detecting pipe line 1, while a low pressure side pressure detector 37a is connected to the downstream end thereof all in series to each other, and via these pressure detectors 44a and 37a, the pressures at the inlet and outlet of the detecting pipe line 1 are transmitted through pipe lines 15 and 18, respectively, to the pressure difference detecting means 8. In the preferred embodiment of the present invention constructed in the above-described manner, since the flow rate of the conveying fluid flowing through the differential pressure detecting pipe line 1 is always known by the flow rate control means 6, the flow rate of the powder material can be solely determined on the basis of the output of the pressure difference detecting means 8.

In the preferred embodiment shown in FIG. 12, as the pressure difference generated across the detecting pipe line 1 by the conveying fluid flowing therethrough does not become 0 even when the feed rate of the powder material is 0, the characteristic curve representing the output of the pressure difference detecting means 8 as a function of the feed rate of the powder material would not pass through the origin of the characteristic diagram. In order to resolve this problem, a low pressure side setting fluid 78 is passed through a low pressure side setting fluid resistor 76, and a pressure difference generated across this fluid resistor 76 is subtracted from the pressure difference generated across the detecting pipe line 1. Then, the characteristic curve can be made to pass through the origin of the characteristic diagram. It is to be noted that reference numerals 16 and 19, respectively, designate purge fluids for enabling the pressure detecting sets 44a and 37a to stably and continuously detect the pressures in the pipe line over a long period of time.

In this preferred embodiment, in order to regulate the flow rate of the powder material introduced into the pipe line through powder introducing means 7 while the flow rate of the conveying fluid is always maintained at a fixed value by the flow rate control means 6, the proportion of flow rates of the conveying fluid 4a injected through a main nozzle 110 and the regulating fluid 4b injected through a by-path nozzle 111 is regulated by opening or closing a regulating valve 112. Thereby regulation of the flow rate of the powder material is effected by regulating the suction force of the injector 21 without varying the total flow rate sucked into the injector 21. In a conventional powder feed apparatus, sometimes it is required to change the total flow rate of the conveying fluid for conveying the powder material in accordance with the properties of the powder material being conveyed and requirements in the apparatus connected to the downstream end of the transport pipe 26. In such cases, the several kinds of control levels for the flow rate are selectively preset in the flow rate control means 6 for the conveying fluid, while scales of a powder flow rate respectively representing different powder flow rates corresponding to the respective control levels for the flow rate of the conveying fluid are prepared in the pressure difference detecting means 8, and the scales in the presssure difference detecting means 8 are selectively used depending upon the selected control level in the flow rate control means 6. By making such provision, the illustrated apparatus can fully achieve the functions of a powder flow rate measuring apparatus which are desired in practical use. Moreover, in the case where such provision is made, a powder flow rate measuring apparatus that is easier in use can be provided by interlocking the flow rate control means 6 for the conveying fluid and the selector for the scales of the powder flow rate in the pressure difference detecting means 8 via interlocking means 113 consisting of any appropriate mechanical means as shown by a double-dot chain line.

In the flow rate measuring apparatuses according to the preferred embodiments of the present invention illustrated in FIGS. 1, 2, 3, 4, 5 and 12 and explained in detail above, the flow rate of a powder material conveyed by a fluid can be detected continuously, reliably and at a high precision. However, practically in most cases, the apparatus is utilized as a detector in the so-called automatic control apparatus for the powder feed rate, in which the detected powder flow rate is always made to coincide with a set value designated externally.

In order to achieve such an objective, an output signal of the pressure difference detecting means in the powder flow rate measuring apparatus according to the present invention as illustrated in FIGS. 1, 2, 3, 4, 5, 6, 7, 8, 9, 10 and 12 and described in detail above, is applied, as an input signal, to the well-known automatic control apparatus of the conventional type such as an electric type, a pneumatic type, etc., and the output of such an automatic control apparatus is coupled via any appropriate known means to flow rate control means, that is, to means for controlling an output pressure of the detecting pipe line or to means for controlling an input pressure of the detecting pipe line, or else as shown in FIG. 5 to means for discharging a powder material in a bulk state, whereby an automatic control system for the powder flow rate can be easily constructed. Thereby many industrially useful objectives can be achieved to a high degree such as stabilization of a feed rate of a powder material, or making a powder feed rate always follow a designated value as coupled to other apparatuses. However, such a conventional automatic control apparatus often has the difficulty that it is too expensive and too large for an installation space to be applied to a small-sized apparatus such as a small-sized burner, flame coating apparatus, powder painting apparatus, etc. In addition, in some cases, an electric control apparatus cannot fulfil the requirement for an essentially safe and explosion-proof structure that is necessary for handling an ignitable or explosive powder material.

Figure 11:
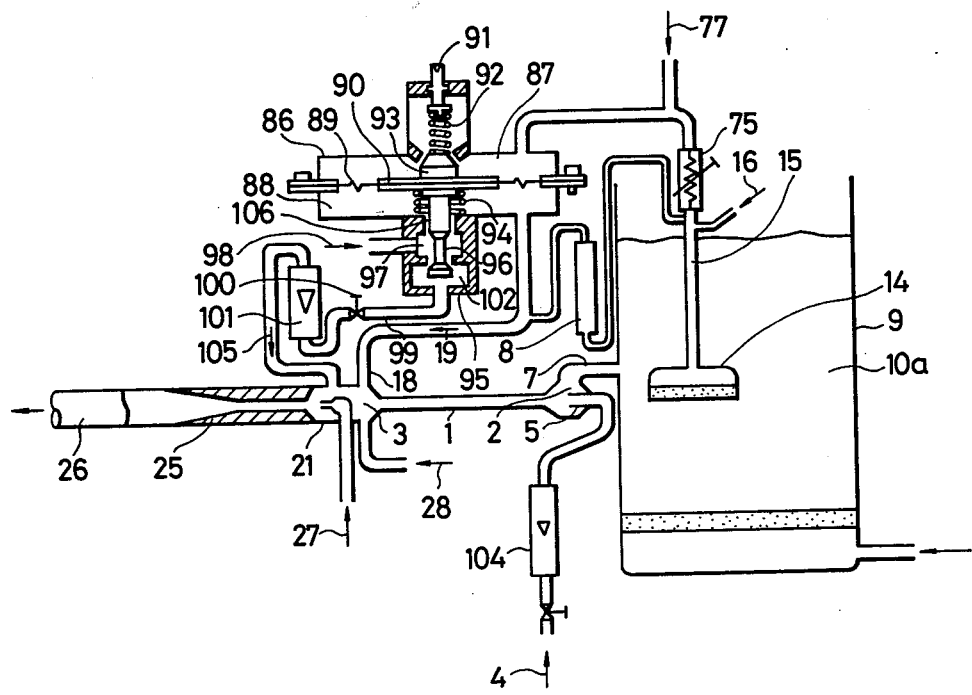

FIG. 11 illustrates a novel flow rate measuring apparatus having a novel automatic control capability for a powder flow rate, which has been developed to fulfil the above-mentioned requirements, in which a powder flow rate measuring apparatus according to the present invention is used as a signal generator and it is combined with a less expensive automatic control apparatus of the fully pneumatic type having an essentially safe and explosion-proof structure which has been newly developed.

In FIG. 11, a fluidized powder material 10a existing within a powder tank 9 flows through a detecting pipe line 1 jointly with a conveying fluid 4 injected from a nozzle 5 via powder introducing means 7, and then is passed through a transport pipe 26 by an injector 21 provided downstream of the detecting pipe line 1 to be conveyed to a desired destination. In this instance, with regard to an operating point of the injector 21, an approximate pressure at the detecting pipe line output 3 is preset by proportioning the driving fluid 27 and the regulating fluid 28. It is to be noted that reference numeral 104 designates a flow meter for measuring the flow rate of a conveying fluid 4. The pressure at the inlet of the detecting pipe line is detected as the pressure within the powder tank 9 at the same level by means of a pressure detector 14 within the tank 9, and this detected pressure is introduced into a high pressure chamber 87 of a control device 86 through a high pressure side pressure transmission pipe 15 and further through a high pressure side setting fluid resistor 75. The pressure at the outlet 3 of the detecting pipe line 1 is introduced through a low pressure side pressure transmission pipe 18 to a low pressure chamber of the control device 86. The pressure difference between the inlet 2 and outlet 3 of the detecting pipe line 1 is introduced into pressure difference detecting means, that is, a differential pressure gauge 8. Thereby the powder flow rate is indicated or, if necessary, recorded, with reference to the flow rate of the conveying fluid 4 which is controlled by flow rate control means not shown, and now the flow rate of the powder material has been made known.

The control device 86 is a pressure amplifier device having its interior divided by a diaphragm 89 into a large area high pressure chamber 87 and a low pressure chamber 88, and as an output of the device, a control source pressure fluid 98 introduced into the valve seat high pressure chamber 97 provided in a valve seat body 95, is introduced into an injector 21 as a regulating fluid through a control output pipe 99, a valve 100 and a flow meter 101 as shown by an arrow 105. The control operation of this control device 86 is as follows. For instance, if the feed rate of the powder material has been increased by any cause and thereby the pressure difference between the inlet and outlet of the detecting pipe line 1 has been increased, then the center of the diaphragm 89 would push down the valve body 96, thereby the flow rate of the control output fluid 105 is increased, as a result the suction force of the injector 21 is weakened and thereby the pressure at the detecting pipe line output 3 is decreased. Thus the flow rate of the powder material flowing into the detecting pipe line 1 through the powder introducing means 7 is restored to its original valve. In the event that the variation occurs in the reversed direction, the control device 86 operates in the opposite direction, and after all, owing to the action of this control device 86 the pressure difference between the inlet 2 and outlet 3 of the detecting pipe line 1 is always kept constant, and as a result, the flow rate of the powder material can be maintained always at a fixed value.

The valve body 96 of this automatic control device 86 is held always coaxial with the valve seat body 95 so as to be finely displaceable in the axial direction by any appropriate means such as parallesheet springs not shown, and it is always urged against a center body 90 of the diaphragm by means of a spring 94 with a very small clearance 106 spaced from the valve seat body 95 so as not to produce frictional resistance. Also, since the valve body 96 is so constructed that the upper surface and the lower surface of its portion located within the valve seat high pressure chamber 97 may have the same area, even if the pressure of the control source pressure fluid 98 fed into this chamber 97 should be varied, the propelling force in the axial direction acting upon the valve body 96 will be maintained always constant. A part of the control source pressure fluid 98 introduced into the valve seat high pressure chamber 97 leaks at a very small rate through the gap clearance 106 to the low pressure chamber 88, and then is blown into the detecting pipe line outlet 3 through a low pressure side pressure transmission pipe 18 to be used as a low pressure side purge fluid 19. In this case, the flow rate of the low pressure side purge fluid 19 is limited to such a very small rate that a serious pressure drop may not be produced in the low pressure side pressure transmission pipe 18. A high pressure side spring 92 disposed in the high pressure chamber 87 of the control device 86 is held at an appropriate operating point via a setting screw 91 which can be manipulated externally, and this makes it possible to arbitrarily select an operating point of the control device 86 through cooperation with the low pressure side spring 94. It is to be noted that reference numeral 93 designates a receptacle for the high pressure side spring 92, through which the resilient force of the high pressure side spring 92 can be transmitted to the center body 90 of the diaphragm 89. In addition, the valve body 96 and the diaphragm center body 90 are assembled only by urging them against each other with springs so that only an axial force may be transmitted from the diaphragm center body 90 to the valve body 96 for the purpose of maintaining the gap clearance 106 always constant and preventing eccentric deviation of the valve body 96 caused by the diaphragm 89.

The valve 100 is a control sensitivity regulating valve to be used for controlling the sensitivity of the valve body 96 in the control device 86. While the operating point of this control device can be reset by changing the amount of preliminary compression of the spring 92 associated with the valve itself as described previously, it is also possible as shown in FIG. 8 to change the powder flow rate by changing the flow rate of the conveying fluid for the same pressure difference across the same detecting pipe line by regulating the conveying fluid 4. Therefore, by setting the flow rate of the conveying fluid by flow rate control means not shown, it is possible to achieve setting of a transport rate of the entire control device, and since this can be done through an operation that can be easily remotely-controlled by flow rate setting of the fluid, it is extremely effective as setting means for a control device. Besides, as a method for changing a set value in the above-mentioned automatic control device, the following method can be employed.

In FIG. 11, when a high pressure side setting fluid as shown by an arrow 77 is made to flow through a high pressure side setting fluid resistor 75, a pressure drop generated across this fluid resistor 75 is added to the pressure difference which is actually generated across the detecting pipe line 1 in response to flowing of a powder material therethrough and detected by the pressure difference detecting means 8, and the sum is applied between the high pressure chamber 87 and the low pressure chamber 88. Accordingly, the control device 86 achieves automatic control operation in response to this increased input signal. Consequently, as compared to the condition where the control device 86 was operating without the pressure drop being generated across the high pressure side setting fluid resistor 75, the same result as that obtained when a smaller set value by the amount of the pressure drop generated across the high pressure side setting fluid resistor 75 as a result of passing the high pressure side setting fluid 77 therethrough is given to the automatic control device 86, would be obtained. Accordingly, change of a set value for the automatic control device can be achieved in this way by inserting a fluid resistor in series with the high pressure side pressure transmission pipe 15 and passing a fluid through this fluid resistor to generate a pressure drop thereacross. Since this arrangement can be constructed with a device that can be very easily remotely-controlled, consisting of the combination of a fluid resistor and a valve, it is very convenient for automatically remotely-controlling the device.

The above-mentioned method for changing a set value of the automatic control device is based on the parallel displacement of a characteristic curve along the arrows 82 in FIg. 10. Hence, as will be apparent from FIG. 10, in the arrangement shown in FIG. 11 if a low pressure side setting fluid resistor is provided in series with the low pressure side pressure transmission pipe 18 and a low pressure side setting fluid is made to flow therethrough, then contrary to the case of setting the high pressure side as described above, the characteristic curve is displaced from the original curve 79 to another curve 81 along the arrows 83 in FIG. 10, change of the flow rate set value in the powder flow rate measuring system including an automatic control device in FIG. 11 can be achieved in a similar manner. However, it is to be noted that in this case as the pressure drop across the setting fluid resistor becomes larger, the automatically controlled flow rate of the powder material being transported in practice through the system is increased.

As described previously, the control sensitivity regulating valve 100 provided in series with the control output pipe 99 serves to regurate the sensitivity of the illustrated control device. More particularly, if the control sensitivity regulating valve 100 is narrowed, then for the same control output flow rate flowing through the control output pipe 99 the pressure in the valve seat low pressure chamber 102 is increased, so that this pressure acts upon the lower surface located within the low pressure chamber of the valve seat 96 and serves to push up the valve seat, contrary to the above, that is, it serves to dampen the motion of the valve seat. Therefore, by narrowing the control sensitivity regulating valve, one can lower the control resistivity of the above-described control device, that is, can reduce the magnitude of the control output flow rate for the same pressure difference input. On the contrary, in the case where it is desired to raise the control sensitivity of the control device 86, the object can be achieved by opening the control sensitivity regulating valve 100.

In FIG. 11, in the event tha a commonly observed phenomena which causes, if left as it is, lowering of a flow rate of a powder material such as, for instance, increase of a deposit on the inner surface of the transport pipe 26 or wear of a throat pipe 25 in the injector 21 has occurred, the control device 86 can immediately detect the change of the flow rate through the above-described process, and so, it acts to always maintain the flow rate of the powder material flowing through the detecting pipe line 1 at a constant value by reducing the flow rate of the control output flowing through the control output pipe 99. In this instance, for example, the state of formation of a deposit on the inner surface of the transport pipe 26 or the state of wear on the inner surface of the injector throat pipe 25, can be presumed by reference to the indication on the flow meter 101 inserted in series with the control output pipe 99, and thereby it becomes easy to detect the necessity for maintenance of an installation, such as renewal and cleaning of transport pipe lines or replacement of an injector throat pipe. Therefore, the insertion of the flow meter is very useful for field working.

Figure 13:
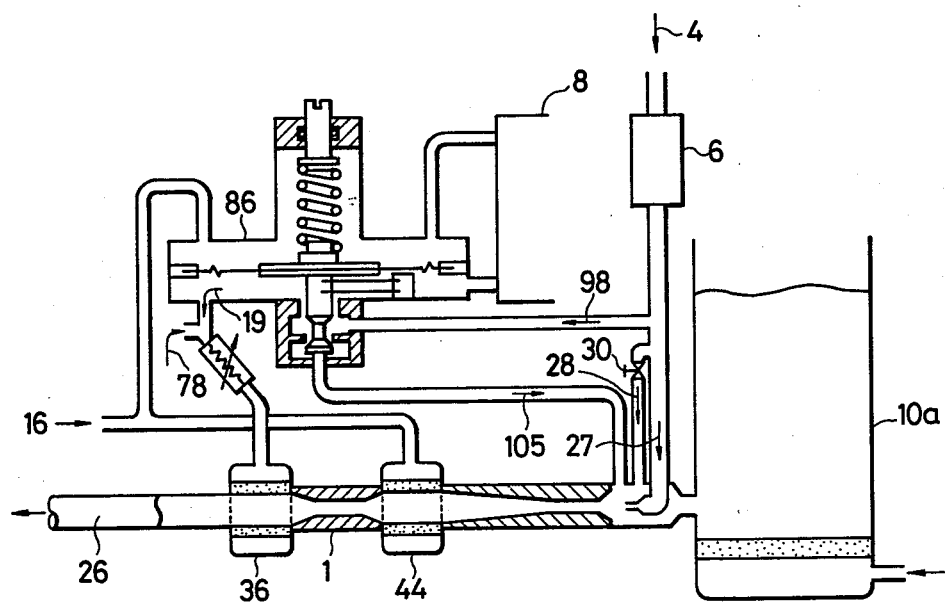

FIG. 13 illustrates an automatic control system for a powder flow rate including a powder flow rate measuring apparatus according to one preferred embodiment of the present invention, in which the powder flow rate measuring apparatus shown in FIG. 12 is combined with the automatic control system shown in FIG. 11.

In FIG. 13, component parts having the same functions as those shown in FIGS. 11 and 12 are all given like reference numerals as noted previously, and therefore, further description of the construction and operation of the illustrated system will be omitted.

With regard to the method for combining an automatic control capability for the flow rate with the powder flow rate measuring apparatus, in addition to the methods described in detail above, a great many methods can be employed. Especially, in the above description, with regard to an operating end, description has been made mainly on the example in which the suction force of an injector is regulated by varying the proportion of the driving fluid and the regulating fluid in the injector.

However, the present invention should not be limited to such type of embodiments, but it is also possible to employ, for example, a method of directly regulating the flow rate or the pressure of the driving fluid in an injector by th output of the control device, and also it is possible to employ a method of regulating the suction force of a transport suction device provided at the tip end of the transport pipe. Beside, regulation of the pressure within a powder tank as shown in FIG. 2 could be utilized as output means of the control device.

For the conveying fluid according to the present invention, mostly gases are utilized, but in some cases liquids could be utilized therefor.

In addition, according to the present invention, by directly connecting an inlet of a detecting pipe line having an inlet and an outlet to a powder tank, the flow speed of the powder material at the inlet portion can be made substantially equal to zero. Accordingly, a pressure difference generated between the inlet and outlet of the detecting pipe line by acceleration of the powder material will be increased linearly in proportion to the flow rate of the powder material. Consequently, the scale of the flow meter becomes a linear scale, which is favorable for use as an instrument.

What is claimed is:

1. A powder flow rate measuring apparatus, characterized in that said apparatus comprises a detecting pipe line having an inlet and an outlet, a nozzle for injecting only a conveying fluid into the inlet of said detecting pipe line, a powder source and means for introducing a powder material to the conveying fluid discharged by the said nozzle, means for controlling the flow rate of the conveying fluid to be fed to said nozzle, a pressure differential detecting means communicating with both the inlet and outlet of the detecting pipe line for monitoring differences in fluid pressure between the outlet end and the powder inlet end of said detecting pipe line, said detecting means communicating with the inlet end upstream of said nozzle with respect to the movement of the powder whereby the inlet pressure detected is that of the powder source.

2. Powder flow rate measuring apparatus as claimed in claim 1, characterized in that the inlet end of the detecting pipe line communicates with the powder tank and is on the same level as the inlet to the detection pipe line.

3. Powder flow rate measuring apparatus as claimed in claim 1, characterized in that the interior of said detecting pipe line has a non-adhesive fluorine resin surface.

4. Powder flow rate measuring apparatus as claimed in claim 1, characterized in that the conveying fluid injection nozzle is inclined with respect to the axial centerline of the detecting pipe line.

5. Powder flow rate measuring apparatus as claimed in claim 1, characterized in that pressure transmission pipes are provided for connecting said pressure differential detecting means to the inlet and outlet of said detecting pipe line and a purge set communicates with the one of said pressure transmission pipes connected to said inlet.

6. Powder flow rate measuring apparatus as claimed in claim 5, characterized in that variable fluid flow restrictors are inserted in said pressure transmission pipes and control fluid introduction ports are connected between said fluid restrictors and said pressure differential detecting means.

7. In an apparatus for transporting a powder material entrained in a fluid, said apparatus having a source of the powder material and a transport conduit and means for measuring and controlling the rate of flow of the powder material, said means being interposed between said source and said conduit and comprising: a detection pipe having an inlet orifice at said source and an outlet at said conduit, a nozzle for introducing conveying fluid under pressure to said pipe at said inlet, a first fluid conduit communicating with said inlet and a second fluid conduit communicating with said outlet; a pressure differential detection means connected to said first and second fluid conduit means for detecting any fluid pressure differential between said inlet and outlet; said first conduit means communicating with said inlet orifice between said powder source and said nozzle whereby the pressure detected is that of the powder and fluid entering from the powder source before introduction of the conveying fluid; control means for maintaining a predetermined pressure differential between said inlet and outlet ends of said detecting pipe to control the rate of flow of the powder material.

8. The apparatus described in claim 7 wherein said fluid is gaseous.

9. The apparatus described in claim 8 wherein means are provided for introducing fluid to said first fluid conduit for maintaining a fluid pressure in said inlet between said nozzle and powder source that is not in excess of the fluid pressure in said powder source.

10. The apparatus described in claim 8 wherein said nozzle has a discharge port directed away from said source of powder.

11. The apparatus described in claim 10 in which said detection pipe, the inlet and outlet thereto and the inlet orifice at which said inlet communicates with the powder source are horizontally aligned.

12. The method of controlling the flow of a powder material to powder application equipment including the steps of providing a source of powder and an elongated pressure detection pipe discharging into a chamber, discharging conveying air at a constant rate into an end of the detection pipe opposite from the chamber to aspirate powder from the source and transport it through the detection pipe, measuring the pressure at the powder source, measuring the pressure in said chamber after discharge into said chamber of the air and powder mix from the detection pipe and measuring the difference between the two measured pressures; controlling the rate at which the powder is delivered to the powder application equipment by controlling the pressure in the chamber and varying the rate of powder delivery by varying the proportion of powder to conveying air; maintaining uniformity of a selected rate of powder transport by maintaining a measured pressure differential of substantially zero between the chamber and the pressure at the powder source whereby the difference in pressure between that in the chamber and that at a point where the powder is entrained into the conveying air as it enters the pressure detection pipe controls the quantity of powder being aspirated into the conveying air and transported through the detection pipe.

13. The method described in claim 12 wherein the powder source pressure is measured between the powder source and the point of discharge of the conveying air.

14. The method described in claim 13 wherein fluid under pressure is introduced into said chamber to vary the fluid pressure between the ends of said detection pipe; varying the rate at which powder is delivered to the powder application equipment by varying the volume of fluid introduced into said chamber.

15. The method described in claim 13 wherein the flow of conveying air is varied to maintain a constant rate of discharge irrespective of changes in the pressure within the area in which the discharge occurs.

16. The method of controlling the flow of a powder material to powder application equipment including the steps of providing a source of powder and an elongated pressure detection pipe discharging into a chamber, discharging conveying air at a constant rate into an end of the detection pipe opposite from the chamber to aspirate powder from the source and transport it through the detection pipe, measuring the pressure at the powder source, measuring the pressure in said chamber after discharge into said chamber of the air and powder mix from the detection pipe and measuring the difference between the two measured pressures to determine the change in density of the flowing medium resulting from the proportion of powder entrained in the air-powder mix; controlling the rate at which the powder is delivered to the powder application equipment by controlling the proportional mix of powder to conveying air entering the pressure detection pipe in response to changes in the pressure differential between the pressure in the chamber and the pressure at a point where the powder is entrained in the conveying air and changing this differential by a controlled introduction of air under pressure into said chamber; maintaining uniformity of a selected rate of powder transport by maintaining a measured pressure differential of substantially zero between the chamber and the pressure at the powder source while maintaining a constant flow rate of the conveying air whereby the difference in pressure resulting from the change in density upon entrainment of the powder controls the quantity of powder aspirated into the conveying air and transported through the detection pipe.

* * * * *

UNITED STATES PATENT AND TRADEMARK OFFICE
CERTIFICATE OF CORRECTION

PATENT NO. : 4 480 947

DATED : November 6, 1984

INVENTOR(S) : Hideo Nagasaka

It is certified that error appears in the above-identified patent and that said Letters Patent is hereby corrected as shown below:

Column 2, line 46: (Per A)
  "therafter" should be --thereafter--

Column 4, line 7:
  "off" should be --of--

Column 4, line 20: (Per A)
  "a" should be --the--

Column 4, line 62: (Per A)
  delete "even" (second occurence)

Column 5, lines 52-53: (Per A)
  delete "that is adjacent thereto"

Column 7, line 21:
  "10-14" should be --10-40--

UNITED STATES PATENT AND TRADEMARK OFFICE
CERTIFICATE OF CORRECTION

PATENT NO. : 4 480 947

DATED : November 6, 1984

INVENTOR(S) : Hideo Nagasaka

It is certified that error appears in the above-identified patent and that said Letters Patent is hereby corrected as shown below:

Column 9, line 52:
    after "condition" insert --not--

Column 13, line 68 et seq:
    delete " as driven by a stirrer driving device 41,"

Column 16, line 53:
    delete "series thereto, a"

Column 20, line 64:
    "FIg." should be "Fig."

Column 21, line 4:
    insert "Therefore" before "change"

Column 21, line 32:
    "tha" should be --that--

Column 21, line 46:
    "presumed" should be --determined--

UNITED STATES PATENT AND TRADEMARK OFFICE
CERTIFICATE OF CORRECTION

PATENT NO. : 4 480 947

DATED : November 6, 1984

INVENTOR(S) : Hideo Nagasaka

It is certified that error appears in the above-identified patent and that said Letters Patent is hereby corrected as shown below:

```
Column 22, line 11:
     "th" (first occurence) should be --the--

Column 23, Claim 6, line 2: (Per A)
     "5" should be --1--
```

Signed and Sealed this

Eighth Day of October 1985

[SEAL]

Attest:

Attesting Officer

DONALD J. QUIGG

Commissioner of Patents and Trademarks—Designate